United States Patent [19]

Abels et al.

[11] 4,255,984
[45] Mar. 17, 1981

[54] PEDAL CONTROL FOR VEHICLE HAVING A CONTINUOUSLY ADJUSTABLE TRANSMISSION

[76] Inventors: Theodor Abels, Goldregenweg 6; Bernhard Götz, Goldregenweg 36, both of 8750 Aschaffenburg, Fed. Rep. of Germany

[21] Appl. No.: 26,020

[22] Filed: Apr. 2, 1979

[30] Foreign Application Priority Data

May 4, 1978 [DE] Fed. Rep. of Germany ....... 2814741

[51] Int. Cl.³ ..................... G05G 1/14; F16D 21/02
[52] U.S. Cl. ..................................... 74/474; 74/476; 74/477; 74/478; 74/512; 192/48.91; 192/96
[58] Field of Search ................. 74/474, 476, 477, 478, 74/512; 192/48.91, 96

[56] References Cited

U.S. PATENT DOCUMENTS

| | | | |
|---|---|---|---|
| 3,768,329 | 10/1973 | Comer, Jr. et al. | 74/477 |
| 3,995,510 | 12/1976 | Yost | 74/478 X |
| 4,040,306 | 8/1977 | Jensen | 74/474 X |
| 4,067,426 | 1/1978 | Murphy | 74/512 X |

FOREIGN PATENT DOCUMENTS 1497770  1/1978  United Kingdom .................... 74/474

*Primary Examiner*—Allan D. Herrmann
*Attorney, Agent, or Firm*—Yount & Tarolli

[57] ABSTRACT

A control assembly is for use in a vehicle having a transmission with an output shaft whose speed and direction are continuously adjustable by means of a selector rod. A pedal is movable in one direction from a rest position and a switchable mechanism connects the selector rod with the pedal. In a first condition when the pedal is depressed, the switchable mechanism causes the selector rod to move in one direction from a central position in which the output shaft does not rotate. This in turn causes the output shaft to rotate in one direction. When the switchable mechanism is shifted to a second condition, depressing the pedal causes the selector rod to move in the opposite direction from its central position, and this causes the output shaft to rotate in the opposite direction. Shifting of the switchable mechanism from one condition to another is effected by a solenoid which is controlled by a circuit. The circuit includes a selector switch for actuating the solenoid to cause the switchable mechanism to change conditions, and the selector switch may be actuated at any position of the pedal. The circuitry, however, enables the switchable mechanism to be changed from one condition to the other only when the selector rod is in its central position.

6 Claims, 2 Drawing Figures

PEDAL CONTROL FOR VEHICLE HAVING A CONTINUOUSLY ADJUSTABLE TRANSMISSION

BACKGROUND OF THE INVENTION

The present invention relates to pedal controls for vehicles equipped with a continuously adjustable transmission. In particular, the present invention relates to a pedal control for use with a transmission having an output shaft the speed of which is continuously adjustable by means of a selector rod movable between two extreme positions corresponding to maximum speeds in opposite directions through a center position in which the output shaft is stopped.

There are known pedal control systems for use with such a transmission. In one, (see German Pat. No. 1,030,6940) two side by side pedals are linked for movement in opposite directions. The pedals are even with each other when the transmission selector rod is in the center position. In this two pedal system, one pedal is pressed to drive in one direction, the other is pressed to drive in the opposite direction. It is also known to use a third pedal to control application of the vehicle's brakes (see German Pat. No. 1,296,532).

Although the above mentioned control systems have proven very advantageous, difficulties have been encountered by drivers who must shift frequently between vehicles equipped with one of these control systems and vehicles equipped with a normal control system such as is found in an automobile. Accordingly there has been a proposal to alter the two and three pedal control systems discussed above to provide a single pedal control more like that found in a normal automobile. German Disclosure/Patent Application No. 2,406,611 shows such an idea. However, the alterations proposed are difficult to make, and the resulting single pedal control may prove difficult to operate because of large spring and friction forces.

SUMMARY OF THE PRESENT INVENTION

The present invention provides a new and improved control assembly for use with the above-mentioned type of transmission. It is especially suited for use with hydrostatic transmissions which have a single selector rod to control the speed and direction of an output shaft. The control assembly of the present invention may be installed on vehicle formerly equipped with a two or three pedal control system, and only minor modifications are necessary. The control assembly is low in friction and therefore easy to operate. In addition, control assembly of the present invention provides a safety lockout which prevents shifting the transmission from forward to reverse until the selector rod is in a center position corresponding to the output shaft not being driven.

The present invention provides a control assembly to shift the selector rod of a transmission between two extreme positions corresponding to maximum output shaft speeds in opposite directions. Intermediate between the extreme positions of the selector rod is a center position in which the output shaft does not rotate. The assembly includes a pedal movable downward from a rest position and a switchable mechanism connecting the pedal with the selector rod of the transmission. The switchable mechanism has a first condition in which downward motion of the pedal causes motion of the selector rod toward one of its extreme positions. In a second condition of the switchable mechanism downward motion of the pedal causes motion of the selector rod toward the other extreme position.

A selector switch is connected through a circuit with a servomotor to control the condition of the switchable mechanism. Although the selector switch may be actuated at any position of the pedal, a lockout in the circuit prohibits the servomotor from switching the condition of the switchable mechanism except when the selector rod is in its center position.

In addition, the present invention provides a sturdy mechanical design which will not show significant wear even after prolonged use. Further, once the selector switch has been moved to preselect an opposite driving direction, a mechanical device prevents the pedal from being further depressed and allows it only to return to its rest position.

BRIEF DESCRIPTION OF THE DRAWINGS

The above and other features of the present invention will become more apparent upon reading the following description of a preferred embodiment of the invention together with the accompanying drawings in which.

DESCRIPTION OF PREFERRED EMBODIMENT

Figure 1:
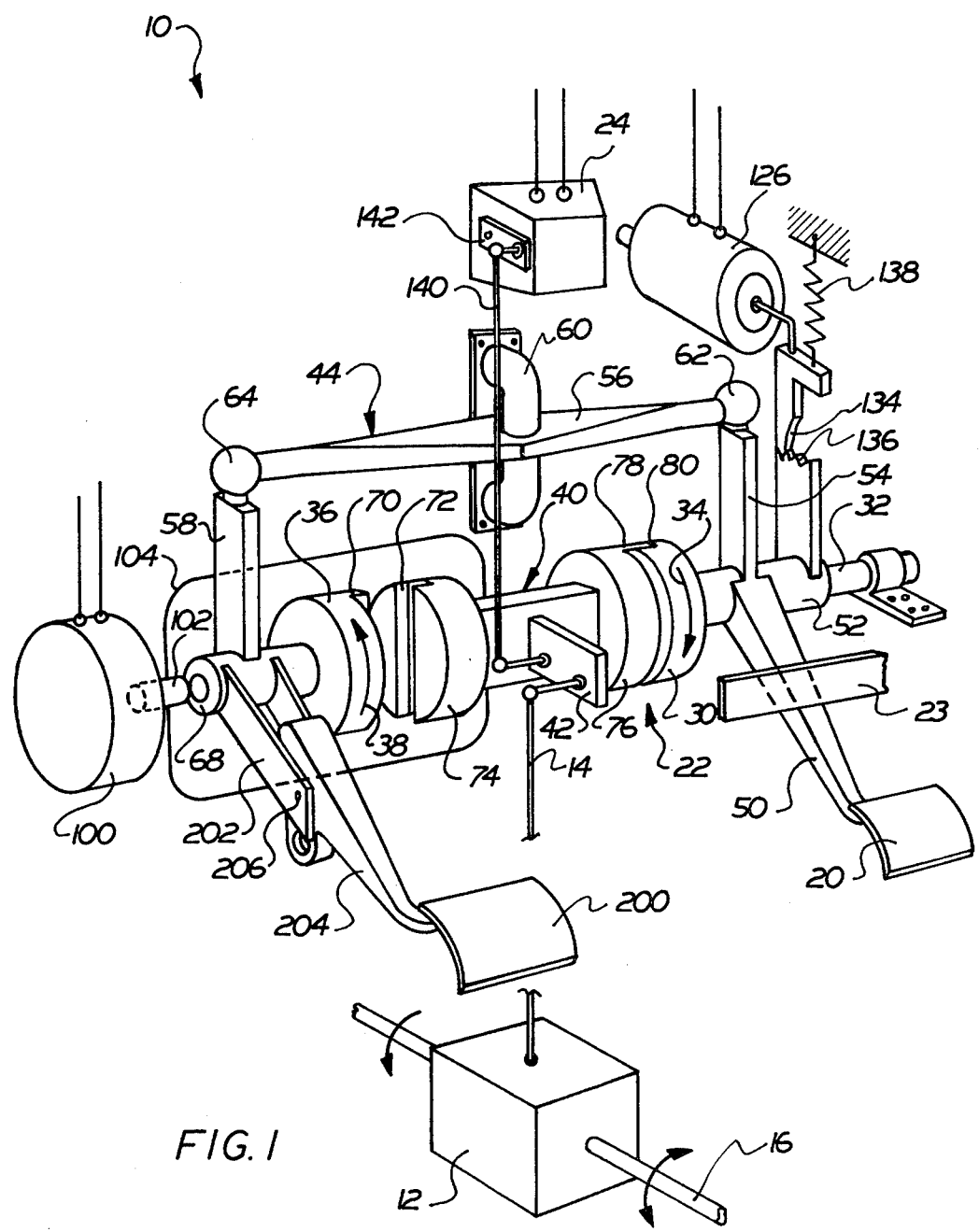
FIG. 1 is a schematic illustration of a control assembly contructed according to the present invention.

FIG. 1 illustrates a control assembly 10 constructed in accordance with the present invention. The control assembly 10 is suited for use in a vehicle (not shown) having a transmission 12 which is controlled by a selector rod 14. The transmission 12 may be a hydrostatic transmission. The selector rod 14 is axially movable between extreme positions corresponding to maximum speeds of the output shaft 16 in opposite directions. The central position of the selector rod 14, the position illustrated in FIG. 1, corresponds to the output shaft 16 being stopped. By moving the selector rod 14 axially the speed and direction of the output shaft 16 and the vehicle may be continuously adjusted.

The control assembly 10 includes a pedal 20 which is moved downward from its (illustrated) rest position to move the selector rod 14. A switchable mechanism 22 which connects the pedal 20 with the selector rod 14. The switchable mechanism 22 may be shifted from one condition in which depressing the pedal 20 causes the selector rod 14 to move axially upward toward one of its extreme positions and another condition in which depressing the pedal 20 causes the selector rod to move axially downward toward its opposite extreme position.

Figure 2:
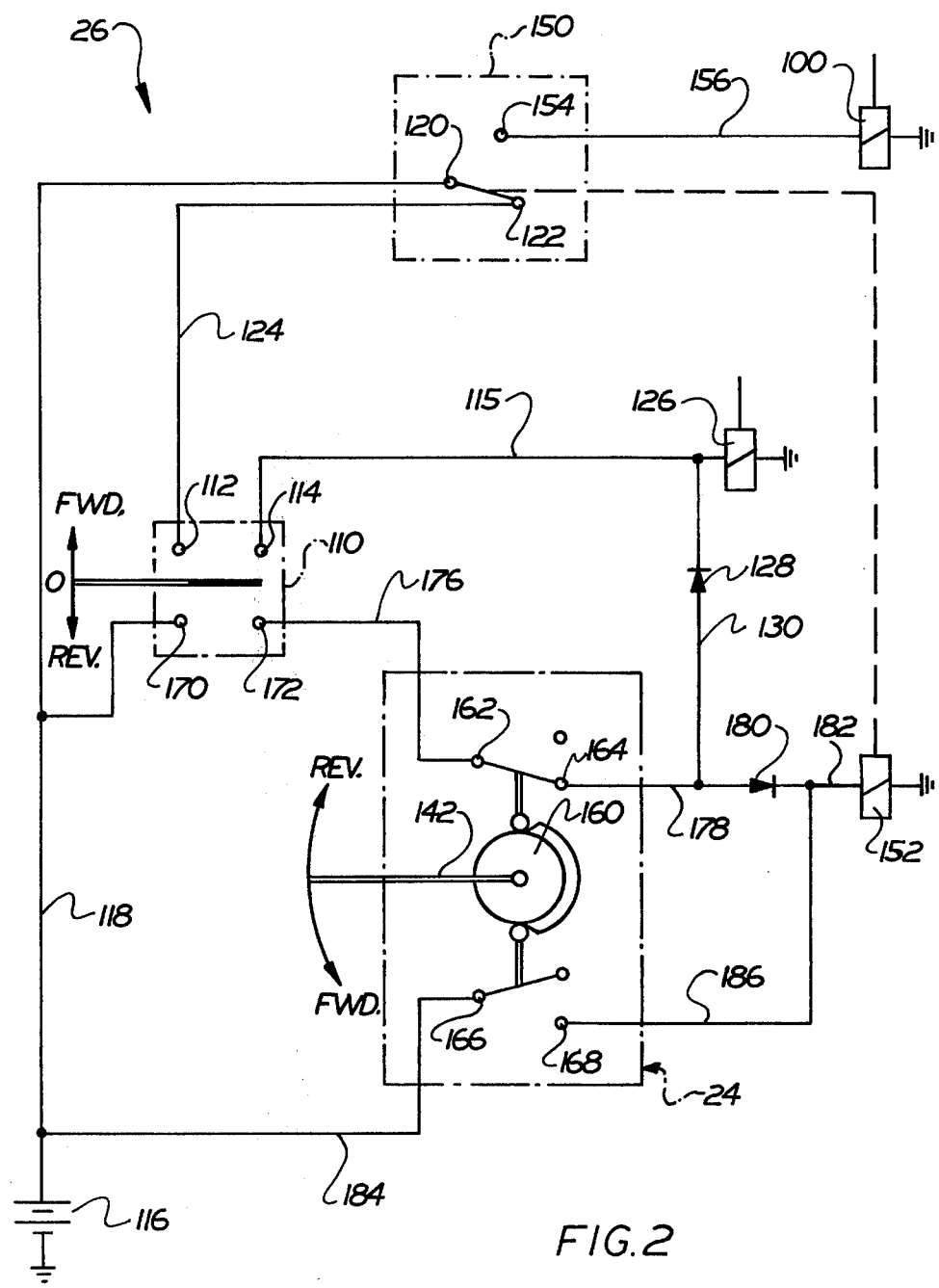
FIG. 2 is a schematic illustration of an electric circuit for use with the control assembly of FIG. 1.

The control assembly 10 also includes a lockout switch 24 which together with the circuit 26 shown in FIG. 2 prevents the switchable mechanism 22 (FIG. 1) from changing from one condition to the other unless the pedal 20 in in its uppermost, rest position in which it abuts a pedal stop 23.

When the pedal 20 is depressed from its rest position, the righthand drive member 30 rotates about the axis of the axle 32 in the direction indicated by the arrow 34. Simultaneously the lefthand drive member 36 rotates about the same axis in the opposite direction as indicated by the arrow 38. A switch member 40 is slidable along the axis of rotation of the drive members 30 and 36 into engagement with one or the other of the drive members, and accordingly the switch member is rotated in one direction or the other depending on which drive member it engages.

The selector rod 14 is pivotably connected with a lever 42 which extends radially outward from switch member 40. When the switch member 40 rotates, the selector rod 14 undergoes axial motion in one direction or the other depending on which of the drive members 30 and 36 the switch member engages.

The rotation of the right and lefthand drive members 30 and 36 in opposite directions when the pedal 20 is moved in only one direction is achieved by a linkage 44 which connects them. The pedal 20 is mounted by means of a pedal lever 50 and a hollow cylinder 52 which serves as a bearing to facilitate rotation about the axle 32. The axle 32 is rotatably received in the hollow cylinder 52. An arm 54 is also connected to the hollow cylinder 52. When the pedal 20 is depressed from its rest position, the arm 54 rotates about the axle 32.

A double arm lever 56 pivots about its midpoint on a shaft 60 which is perpendicular to the axle 32. At one end 62 of the double arm lever 56 a ball and socket joint pivotably connects the double arm lever with the radially outer end of the arm 54. At its other end 64, the double arm lever 56 is pivotably connected with the radially outer end of an arm 58.

The arm 58 is substantially the same as the arm 54. The arm 58 is connected with a hollow cylinder 68 which in turn is mounted for rotation about an axis coaxial with the axis of the axle 32. The left hand drive member 36 is also connected with the hollow cylinder 68.

When the pedal 20 is depressed, the arm 54 rotates about the axle 32 and causes the double arm lever 56 to pivot about the shaft 60. As viewed in FIG. 1, the righthand end portion 62 of the double arm lever 56 moves forward from the plane of the paper as the pedal 20 is depressed. Simultaneously, the opposite end portion 64 of the double arm lever 56 recedes into the plane of the paper, and the connection with the arm 66 causes the arm 58 to rotate about the axis of the axle 32. Thus, when the pedal 20 is depressed, the righthand drive member 30 rotates in the direction of the arrow 34, and through the action of the linkage 44 connecting it with the pedal, the lefthand drive member 36 is caused to rotate in the opposite direction as indicated by the arrow 38.

The switch member 40 is shiftable along the axis of the axle 32 so that it engages either the righthand drive member 30 (as illustrated in FIG. 1) or the lefthand drive member 36. The lefthand drive member 36 is cylindrical and has a projection 70 extending diametrically across one face. A driven member 74 is connected with the switch member 46, and it has a slot 72 in which the projection 70 is received when the switch member is shifted into engagement with the lefthand drive member 36.

Another driven member 76 is connected with the switch member 40 axially opposite from the driven member 74 and facing the drive member 30. The driven member 76 has a projection 78 which extends into a diametrical slot 80 in the cylindrical drive member 30 when the switch member 40 is in the position illustrated in FIG. 1.

The projection and slot arrangements 70-72 and 78-80 serve to transmit rotation from the drive members 36 and 30, respectively, to the switch member 40. Because of the robust design of the projections and slots 70, 72, 78 and 80, and the relatively large load transmitting surfaces, little or no wear is expected over the lifetime of the control assembly 10.

The switch member 40 is shifted between drive transmitting engagement with the righthand drive member 30 and the lefthand drive member 38 by means of a solenoid or servo mechanism 100. The solenoid 100 has a spring (not shown) biasing its piston 102 to the right as viewed in FIG. 1 so that the driven member 76 is urged into engagement with the righthand drive member 30. The piston 102 is connected with the switch member 40 by means of a strap 104 which may be made of spring steel.

The operation of the solenoid 100 is controlled by the circuit 26 illustrated in FIG. 2. To drive in a forward direction, the operator first moves the selector switch 110 so that a complete circuit is established between contacts 112 and 114. The selector switch 110 may be located anywhere that is convenient for manual operation, such as on the dashboard of the vehicle.

When the switch 110 is moved to select the forward direction current from the power source 116 flows through wire 118, contacts 120 and 122, wire 124, contacts 112 and 114 and wire 115 to actuate solenoid 126. Diode 128 prevents current from flowing into wire 130.

The solenoid 126 is connected with a pawl 134 (FIG. 1) which cooperates with a ratchet 136 to limit motion of the pedal 20 in one direction. The pawl 134 is biased into engagement with the ratchet 136 by a spring 138. The ratchet 136, in turn, is fixed to the hollow cylinder 52. Unless power is supplied to the solenoid 126, the pawl 134 and ratchet 136 are engaged and prevent the pedal 20 from moving downward. Upward motion to the rest position is permitted regardless of whether or not power is supplied to the solenoid 134.

When the selector switch 110 (FIG. 2) is moved to the forward position, pawl 134 (FIG. 1) and ratchet 136 are disengaged and the pedal 20 may be moved downward. Because the righthand drive member 30 and the switch member 40 are biased into engagement by a spring (not shown) within the solenoid 100, downward movement of the pedal 20 cuases the switch member 40 to rotate in the direction of the arrow 34, and the selector rod 14 moves downward causing forward rotation of the output shaft 16. Simultaneously the lockout linkage 140 causes the lever 142 of the lockout switch 24 to move downward. The lockout switch 24 prevents the solenoid 100 from being actuated to shift the switch member 40 unless the pedal 20 is in its uppermost, rest position.

Referring to FIG. 2, it can be seen that the lockout switch 24 controls power to the solenoid 100 through solenoid operated switch 150. The lockout switch 24 (FIG. 1) prevents the solenoid 100 from being actuated or, if actuated, from being released unless the pedal 20 is in its rest position and the projections 70 and 78 are aligned with the slots 72 and 80 respectively. The switch 150 (FIG. 2) is operated by solenoid 152. When power is supplied to the solenoid 152, the switch 150 establishes contact between contacts 120 and 154 and current flows from the power source 116, through wires 118 and 156 to energize the solenoid 100. When power is not applied to solenoid 152, a spring (not shown) biases the switch 150 to establish contact between contacts 120 and 122.

When the lever 142 of the lockout switch 24 moves downward, a cam 160 breaks the connection between contacts 162 and 164, and there remains no connection between contacts 166 and 168. The pairs of contacts 162–164 and 166–168 may be the contacts of conventional microswitches. When the lever 142 of the lockout switch moves downward, power is not applied to solenoid 152, and the solenoid 100 is not actuated. This prevents shifting of the switch member 40 (FIG. 1) when the selector rod 14 is displaced downward from its central position.

If the operator desires to change directions, the selector switch 110 (FIG. 2) is operated to break the connection between contacts 112 and 114 and establish a connection between contacts 170 and 172. When the connection between contacts 112 and 114 is broken, power no longer flows to the solenoid 126, and as a consequence the pawl 134 (FIG. 1) engages the ratchet 136 to prevent any further downward motion of the pedal 20. At the same time, establishing the connection between contacts 170 and 172 (FIG. 2) enables a voltage to be applied through wire 176 to terminal 162 of the lockout switch 24.

No current will be applied to the solenoid 152 to switch 150 and thereby to cause solenoid 100 to shift the switch member 40 (FIG. 1) until the pedal 20 and the lockout lever 142 returns to their rest positions. Once the lever 142 returns to its central, rest position, the cam 160 enables contact to be established between contacts 162 and 164, and current then flows through wire 178, doide 180 and wire 182 to energize solenoid 152. Also, current flows from wire 178 through wire 130 and diode 128 to release the pawl and ratchet 134 and 136 (FIG. 1). Power at solenoid 152 (FIG. 2) causes the switchable mechanism 22 (FIG. 1) to shift, and depressing the pedal 20 will cause upward motion of the selector rod 14 and of the lockout lever 142 and reverse motion of the output shaft 16.

When the selector rod 142 (FIG. 2) moves upward, the cam 160 causes a connection to be established between contacts 166 and 168. This permits current from the source 116 to flow through the wires 184, 186 and 182 to the solenoid 152. This assures that power will flow to solenoids 152 and 100 even if the selector switch 110 is operated to interrupt the flow between contacts 170 and 172. Thus, power will be supplied to solenoid 100 (FIG. 1) until two conditions are met. First, the lockout lever 142 and the pedal 20 return to the neutral or rest positions there by breaking connections between contacts 166 and 168. Second, the selector switch 110 must be operated out of the reverse mode to break the connection between contacts 170 and 172.

To return the pedal 20 and lockout lever 142 to the rest position a stop pedal 200 is provided. The stop pedal 200 is connected with the hollow cylinder 68 by means of an articulated lever arm 202, 204. Depressing the stop pedal 200 at first causes the linkage 44 to return the pedal 20 to its rest position. A spring (not shown) maintains the lever arm parts 202 and 204 in an aligned relation as shown in FIG. 1. If the stop pedal 200 is depressed further, the outer arm 204 pivots around the axis of pin 206 against the bias of the spring (not shown) to actuate a friction brake on the vehicle.

Thus, it is clear that the present invention provides a control assembly 10 to shift the selector rod 14 of a transmission 12 between two extreme positions corresponding to maximum output shaft speeds in opposite directions. The assembly includes a pedal movable downward from a rest position and a switchable mechanism 22 connecting the pedal with the selector rod 14 of the transmission. The switchable mechanism 22 has a first condition in which downward motion of the pedal 20 causes motion of the selector rod 14 toward one of its extreme positions, and a second condition in which downward motion of the pedal causes motion of the selector rod toward the other extreme position. A selector switch 110 (FIG. 2) is connected through a circuit with a solenoid or servomotor 100 to control the condition of the switchable mechanism 22. Although the selector switch 110 may be actuated at any position of the pedal 20, a lockout switch 24 in the circuit prohibits the solenoid 100 from switching the condition of the switchable mechanism 22 except when the selector rod 14 is in its center position. Further, once the selector 110 switch has been moved to preselect the opposite driving direction, a ratchet 136 and pawl 134 prevents the pedal 20 from being further depressed and allows it only to return to its rest position.

The following is claimed:

1. A control assembly for use in a vehicle having a transmission comprising an output shaft whose speed is controlled by a selector rod continuously adjustable from one extreme position through a central position to a second extreme position, the extreme positions corresponding to maximum rotational speeds of the output shaft in opposite directions, the central position corresponding to the output shaft being stopped, said control assembly comprising a pedal movable in one direction from a rest position, a switchable mechanism connecting said pedal with the selector rod, said switchable mechanism having a first condition in which motion of said pedal in said one direction causes a corresponding motion of the selector rod toward said one extreme position and a second condition in which motion of said pedal in said one direction causes a corresponding motion of the selector rod toward said second extreme position, servo means for switching said switchable mechanism from said first condition to said second condition, a selector switch for actuating said servo means to cause said switchable mechanism to change conditions and actuable at any position of said pedal, and circuit means connecting said selector switch and said servo means, said circuit means comprising safety lockout switch means for enabling said switchable mechanism to change conditions only when the selector rod is in its central position.

2. An assembly as set forth in claim 1 wherein said lockout switch means has first and second pairs of contacts controlling the flow of power to said servo means, each of said pairs of contacts having a closed position which enables power to flow through said pair of contacts to said servo motor and an open position in which no power flows through said pair of contacts, said lockout switch means being connected with said selector rod and having both of said pairs of contacts open when said selector rod is displaced from its central position toward said one extreme position, only one of said pair of contacts being closed when said selector rod is in its central position, both of said pair of contacts being closed when said selector rod is displaced from its central position toward said second extreme position, said servo means having spring means biasing said switchable coupling to said first condition and shifting said switchable coupling to said second condition upon the application of power to said servo means.

3. An assembly as set forth in claim 2 further including means for preventing motion of said pedal in said one direction when said selector switch has been operated to actuate said servo means to thereby cause said switchable mechanism to change conditions and said pedal is displaced from said rest position.

4. A control assembly for use in a vehicle having a transmission comprising an output shaft whose speed is controlled by a selector rod continuously adjustable from one extreme position through a central position to a second extreme position, the extreme positions corresponding to maximum rotational speeds of the output shaft in opposite directions, the central position corresponding to the output shaft being stopped, said control assembly comprising a pedal movable in one direction from a rest position, a switchable mechanism connecting said pedal with the selector rod, said switchable mechanism having a first condition in which motion of said pedal in said one direction causes a corresponding motion of the selector rod toward said one extreme position and a second condition in which motion of said pedal in said one direction causes a corresponding motion of the selector rod toward said second extreme position, servo means for switching said switchable mechanism from said first condition to said second condition, a selector switch for actuating said servo means to cause said switchable mechanism to change conditions and actuable at any position of said pedal, and circuit means connecting said selector switch and said servo means and for enabling said switchable mechanism to change conditions only when the selector rod is in its central position, said circuit means including a lockout switch, said lockout switch having first and second pairs of contacts controlling the flow of power to said servo means, each of said pairs of contacts having a closed position which enables power to flow through said pair of contacts to said servo motor and an open position in which no power flows through said pair of contacts, said lockout switch being connected with said selector rod and having both of said pairs of contacts open when said selector rod is displaced from its central position toward said one extreme position, only one of said pair of contacts being closed when said selector rod is in its central position, both of said pair of contacts being closed when said selector rod is displaced from its central position toward said second extreme position, said servo means having spring means biasing said switchable coupling to said first condition and shifting said switchable coupling to said second condition upon the application of power to said servo means.

5. An assembly as set forth in claim 4 further including means for preventing motion of said pedal in said one direction when said selector switch has been operated to actuate said servo means to thereby cause said switchable mechanism to change conditions and said pedal is displaced from said rest position.

6. An assembly as set forth in claim 5 wherein said selector switch has a first position corresponding to said first condition of said switchable mechanism, and a second position corresponding to said second condition of said switchable mechanism, and said means for preventing motion of said pedal in said one direction includes a ratchet and a pawl, said ratchet and pawl being spring biased into engagement with each other to lock said pedal against motion in said one direction, and a solenoid for disengaging said ratchet and pawl to thereby release said pedal for motion in said one direction, said circuit means providing power to said solenoid only when said selector switch is in a position corresponding to the condition of said switchable mechanism.

* * * * *